Jan. 7, 1930. P. V. HUNTER 1,742,353
CONDUIT OR DUCT FOR ELECTRIC CABLES
Filed July 21, 1928 2 Sheets-Sheet 2
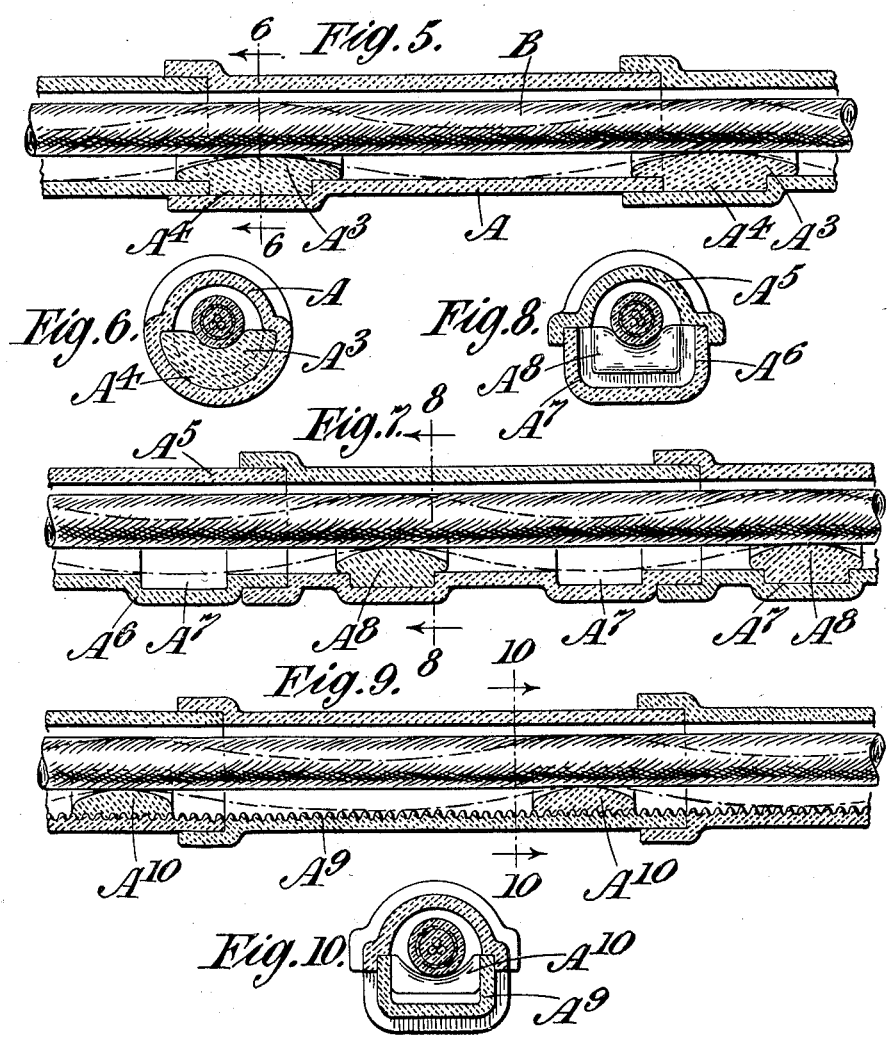
Philip Vassar Hunter
Inventor,
Per,
Watson, Coit, Musser & Grindle
Attys Patented Jan. 7, 1930

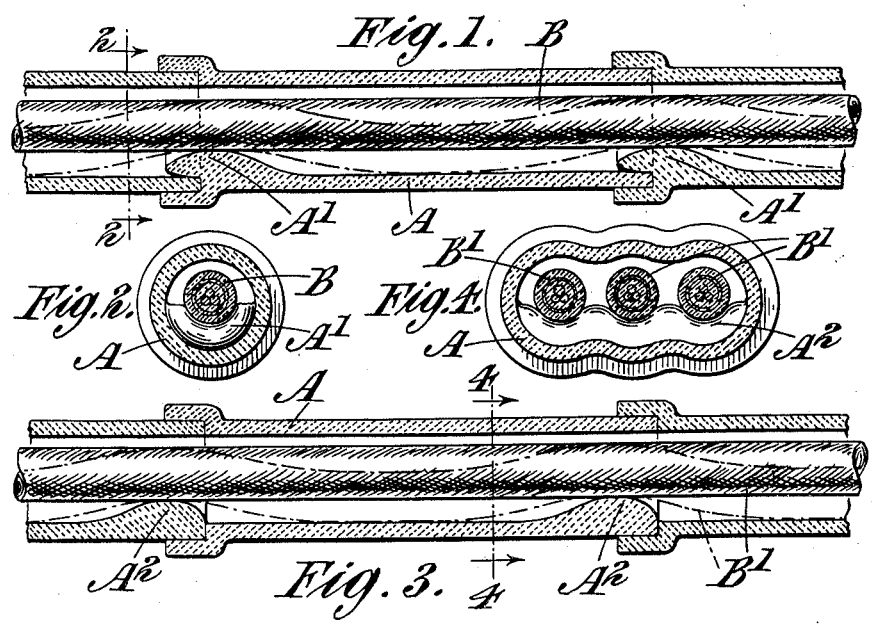

1,742,353

UNITED STATES PATENT OFFICE

PHILIP VASSAR HUNTER, OF LONDON, ENGLAND

CONDUIT OR DUCT FOR ELECTRIC CABLES

Application filed July 21, 1928, Serial No. 294,561, and in Great Britain August 12, 1927.

This invention relates to conduits or ducts for electric power cables and has for its object to furnish a conduit in which provision is made for expansion of the cable under load.

To this end the conduit or duct is provided with saddles or raised portions at intervals in its length on which saddles the cable rests. The intervals between these saddles and their height above the floor or internal bottom surface of the duct will depend upon the nature of the cable, for instance upon its tendency to sag when unloaded by reason merely of its own weight.

The saddles are so proportioned and spaced that normally the cable is supported by them clear of the floor of the duct by an amount preferably just sufficient to allow the cable to rest upon the floor of the duct when it sags due to expansion under continuous maximum load.

Merely as a rough example a cable having a copper core of say .15 square inches in section and with average insulation may be supported in its duct by saddles approximately half-an-inch high and spaced two feet apart.

The saddles may be moulded or otherwise made integral with the conduit or duct and are shaped to suit the cross-sectional dimensions of the cable. When two or more cables are laid side by side in the same conduit the saddles may be made with a corresponding number of curved recesses.

In addition to providing spaced supports for the cable the saddles are advantageous in reducing friction when the cable is drawn in.

The sides of the saddles may be sloped or curved so that they do not form abrupt ridges or projections across the length of the duct but rise gradually from the floor thereof. This facilitates the drawing-in of the cable.

The main portion of the conduit or duct may be of any usual form and material. It may, for instance, be in two parts one fitting or laid over the other. In such a case the saddles or raised portions according to this invention may be moulded or otherwise formed integral with the lower portion.

In the accompanying drawings,

Figures 1, 3, 5, 7 and 9 are longitudinal sections through various constructions of conduit with saddles all according to this invention, and Figures 2, 4, 6, 8 and 10 are cross-sections of these conduits on lines in the various figures numbered to correspond with the cross-sectional views.

In Figures 1 and 2 the saddle $A^1$ is moulded or otherwise formed integral with the conduit A near its flanged or socket end where it receives the plain or spigot end of the adjacent length of conduit. The conduit in this example is circular in cross-section and is intended for use with a single cable B which is drawn in.

Figures 3 and 4 illustrate a conduit where the saddle $A^2$ is formed at the spigot end of the conduit and by way of example these figures also show the conduit and saddle adapted to receive three cables $B^1$ side by side.

In Figures 5 and 6 the saddle $A^3$, instead of being moulded integral with the conduit, is formed with a projection or key $A^4$ which fits into a recess in the flanged end of one length of the conduit and is kept in place by the adjacent plain end of the next length.

Figures 7 and 8 illustrate the invention as applied to a conduit divided longitudinally into two parts $A^5$ and $A^6$ so that the cable may be laid rather than drawn in. In this construction the lower portion $A^6$ of the conduit is formed with recesses $A^7$ into which the saddles $A^8$ are inserted before the cable is laid and the cover $A^5$ put on. As shown in Figure 7 each length of the conduit may be formed with more than one of the recesses $A^7$ so that the saddles may be spaced to suit the particular cable which is laid in the conduit. Figure 7 shows each length of conduit provided with one saddle the other recess $A^7$ being left vacant.

In Figures 9 and 10 the conduit is also divided longitudinally but in this construction the lower portion $A^9$ is formed with a number of internally projecting teeth or ridges and the saddle $A^{10}$ is provided with corresponding projections and recesses so that one or more saddles may be placed in any desired positions in the conduit to suit the requirements of the particular cable to be laid therein.

In all the longitudinal sections the position of the cable when it sags due to expansion under continuous maximum load is indicated in chain lines.

The figures are to be regarded as diagrammatic and in practice the length of the conduit and the space between neighbouring saddles would generally be considerably greater than that shown.

It is to be understood that the primary function of the saddles is to support a heavy modern electric power cable in its conduit so that it can expand due to a rise of temperature under load without risk of damage to the cable or to the conduit. Incidentally the saddles diminish friction between the cable and the conduit in cases where the cable is drawn in. The function of the saddle is not in any way to insulate the conductor of the cable from the conduit for in a modern cable such insulation is adequately provided for in the construction of the cable itself.

What I claim as my invention and desire to secure by Letters Patent is:—

1. In an electric system embodying an insulated power cable adapted to carry a definite maximum load for an appreciable time interval, a conduit provided with raised saddles interiorly thereof at intervals in its length, said saddles being so proportioned and spaced in relation to the dimensions of the cable and the predetermined maximum load which it is intended to carry that the cable can sag freely, thus being free from compressive forces, until it has expanded to the extent brought about by continuous maximum load when it just rests upon the floor of the conduit.

2. In an electric system embodying an insulated power cable adapted to carry a definite maximum load for an appreciable time interval, the combination with a conduit for encasing the cable and having the lower portion of the inner wall thereof formed with a plurality of recesses, of detachable saddles adapted to engage selected recesses and to form supports for the cable, the height of the saddles in relation to the dimensions of the cable and the predetermined maximum load which it is intended to carry being such that the cable can sag freely, thus being free from compressive forces, until it has expanded to the extent brought about by continuous maximum load when it just rests upon the floor of the conduit.

3. In an electric system embodying an insulated power cable adapted to carry a definite maximum load for an appreciable time interval, the combination with a conduit for encasing the cable, of supports for the cable within the conduit, said supports being so proportioned and spaced in relation to the dimensions of the cable and the predetermined maximum load which it is intended to carry that the cable can sag freely, thus being free from compressive forces, until it has expanded to the extent brought about by continuous maximum load when it just rests upon the floor of the conduit.

In testimony whereof I have signed my name to this specification.

PHILIP VASSAR HUNTER.